WIDEBAND HYBRID RING NETWORK

Filed March 2, 1967 2 Sheets-Sheet 1

INVENTOR
JOSEPH CAPPUCCI

BY Darby & Darby
ATTORNEYS

INVENTOR
JOSEPH CAPPUCCI
BY Darby & Darby
ATTORNEYS

United States Patent Office 3,504,304

Patented Mar. 31, 1970

3,504,304

WIDEBAND HYBRID RING NETWORK

Joseph D. Cappucci, Fort Lee, N.J., assignor to Merrimac Research and Development, Inc., West Caldwell, N.J., a corporation of New York Filed Mar. 2, 1967, Ser. No. 619,972
Int. Cl. H01p 5/12
U.S. Cl. 333—11 10 Claims

ABSTRACT OF THE DISCLOSURE

A hybrid ring electrical network in which circuits are connected to junctions of the network to provide compensation to increase the operating efficiency of the network.

BACKGROUND OF THE INVENTION

Field of the invention

This invention relates to electrical networks and more particularly to a hybrid ring network which is compensated in a manner to increase the bandwidth and/or decrease the input voltage standing wave ratio from that obtainable with prior art devices of the same general type.

DESCRIPTION OF THE PRIOR ART

Hybrid networks are known in the prior art (e.g., Hylas et al., Patent 2,735,986) in which four sections of transmission line are connected in a ring type circuit. As is usual in such circuits, some provision is made to supply the 180° phase shift needed for the E arm excitation of the network such as by crossing over the two conductors of one transmission line section. When properly constructed the hybrid ring can couple an input signal applied to one junction to separate equipments each connected to separate conjugate junctions (E and H arms), with the fourth junction being terminated with an impedance. Fairly high isolation is provided between the junctions of the conjugate E and H arms, or junctions, as well as between the other two conjugate junctions of the network.

While such prior art devices are generally satisfactory, in that they function in their intended manner to provide isolation between the junctions of conjugate arms of a pair, they are relatively narrow band devices. To state it another way, prior art ring type hybrid networks have generally been characterized as devices which provide the required isolation between conjugate junctions only over a relatively narrow frequency band of signals applied to the input. To further increase the usefulness of these devices it becomes highly desirable to construct a ring type hybrid having an increased operating bandwidth and/or reduction of the input voltage standing wave ratio (VSWR) without a concurrent degradation in the isolation between the conjugate arms of the ring network.

SUMMARY OF THE INVENTION

Accordingly, the present invention is directed to a ring type hybrid network formed by four sections of a suitable transmission medium, for example transmission line, coaxial cables, waveguides, strip-lines, and combinations thereof. These four sections are connected together in the usual manner to form the ring network with one of the arms providing the needed 180° phase shift. A compensating circuit is connected to each of the four junctions of the network to compensate the ring in a manner to increase the operating bandwidth and/or decrease the input VSWR. This is done without decreasing the high isolation between the conjugate arms. In a preferred embodiment of the invention the compensating circuits have the reactive portion of their impedances variable from positive (inductive) to negative (capacitive) over the operating range of the hybrid. This is accomplished by the use of a series resonant circuit.

It is therefore an object of the present invention to provide a compensated ring type hybrid network.

A further object is to provide a ring type hybrid network in which variable reactance circuits are used for compensation to improve the performance of the hybrid.

An additional object is to provide a ring type hybrid network in which a series resonant circuit is connected to each junction.

Other objects and advantages will become more apparent upon reference to the following specification and annexed drawings in which:

BRIEF DESCRIPTION OF THE DRAWINGS

FIG. 1 shows a prior art ring type hybrid network formed by four transmission line (coaxial cable) sections 10–1, 10–2, 10–3 and 10–4. The outer conductor of each section is shown connected to a point of reference potential 11 (ground). The adjacent ends of the inner conductors of sections 10–1 and 10–2; 10–3 and 10–4; and 10–1 and 10–3 are connected together to form junctions having the respective terminals 1, 2 and H. A 180° transposition is formed by connecting the inner conductor of section 10–4 to the adjacent outer conductor of section 10–2 to form a junction having terminal E.

As is conventional with such networks, an input signal is usually applied to the junction at terminal H. Separate equipments (not shown) are connected to the terminals at junctions 1 and 2 and the junction at terminal E is terminated by a suitable impedance (not shown). Each of the transmission line sections is, for example, one quarter wavelength long at a desired operating frequency and the characteristic impedance (Z) of each of the line sections is the $\sqrt{2}$ times the characteristic impedance of the entire network. All of these features are conventional.

Figures 1, 2:
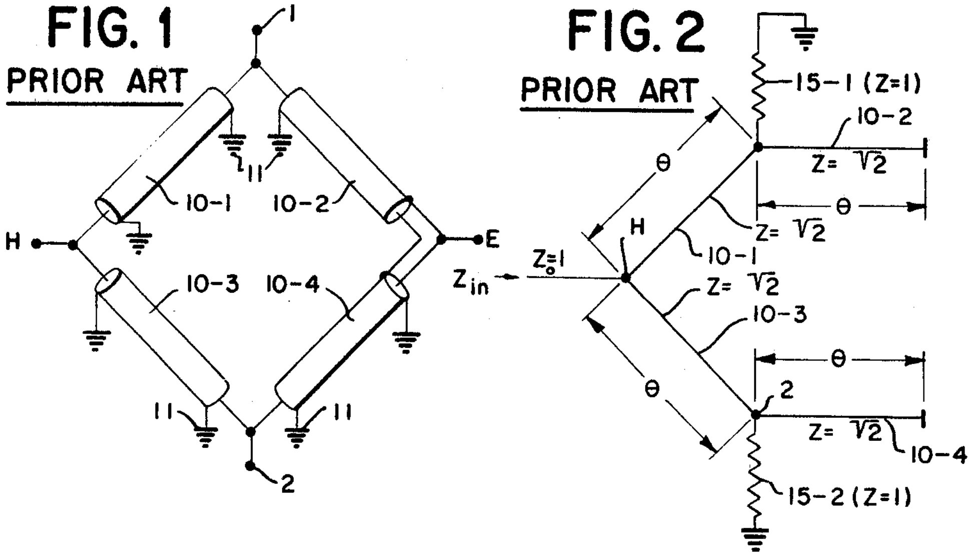
FIG. 1 is a schematic diagram of a hybrid ring network according to the prior art.
FIG. 2 is a schematic diagram of the equivalent circuit of the network of FIG. 1.

The equivalent circuit of the prior art hybrid network of FIG. 1 is shown in FIG. 2. It should be considered that this equivalent circuit is derived from the point of view of input impedance looking into, for example, terminal H. Here, the electrical length of each section 10 is designated by the more general notation $\theta$ (electrical degrees); the characteristic impedance of the entire system is $Z_0=1+j0$ (no reactance); the characteristic impedance Z of each section 10 is $\sqrt{2}Z_0=\sqrt{2}$; and terminals 1 and 2 are terminated by impedances 15–1 and 15–2 of the same values ($Z=1$) as the characteristic impedance of the system. The E junction does not show up in the equivalent circuit of FIG. 2 since it is essentially a short circuit due to any input voltage applied at H being cancelled out at E because of the 180° phase reversal in arm 10–2. This phase reversal is of no consequence in FIG. 2 since only the impedance characteristics of the circuit are being considered.

It can be shown that the input admittance $Y_{in}$ of the circuit of FIG. 2 is $$Y_{in}=\frac{1+\operatorname{Cot}^2\theta-j\sqrt{2}\operatorname{Cot}^3\theta}{1+2\operatorname{Cot}^2\theta} \quad (1)$$

By substituting values of $\theta$ in Equation 1, $Y_{in}$ can be readily obtained and from this the input VSWR ($\rho$) can be calculated from the conventional formula:

$$\rho=\frac{1+\frac{1-Y_{in}}{1+Y_{in}}}{1-\frac{1-Y_{in}}{1+Y_{in}}} \quad (1.1)$$

Table I below sets forth $Y_{in}$ and $\rho$ for values of $\theta$ from 45° to 135° for the network of FIG. 1.

TABLE I

| $\theta°$ | $Y_{in}$ | $\rho$ |
|---|---|---|
| 45 | .66667−j .4714 | 2.00 |
| 50 | .7076−j .3470 | 1.72 |
| 60 | .800−j .1279 | 1.30 |
| 70 | .8953−j .0539 | 1.133 |
| 80 | .9707−j .0073 | 1.03 |
| 90 | 1.000−j .0.0 | 1.00 |
| 100 | .9707+j .0073 | 1.03 |
| 110 | .8953+j .0539 | 1.133 |
| 120 | .800+j .1279 | 1.30 |
| 130 | .7076+j .3470 | 1.72 |
| 135 | .6667+j .4714 | 2.00 |

Figure 5:
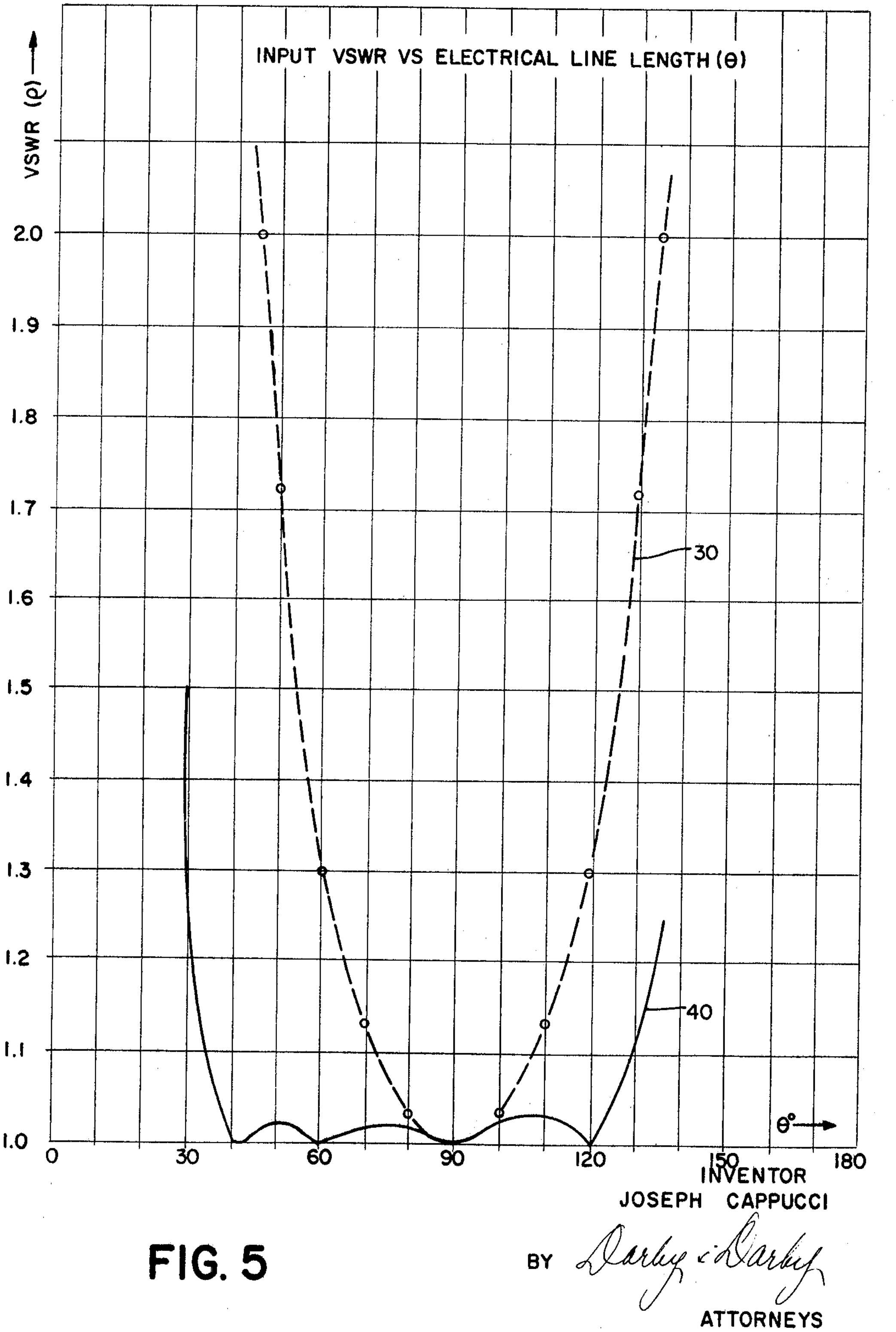
FIG. 5 is a graph comparing the input VSWR of the network of FIGS. 1 and 3.

The values of $\rho$ from Table I are plotted on the graph of FIG. 5 as curve 30.

Figure 3:
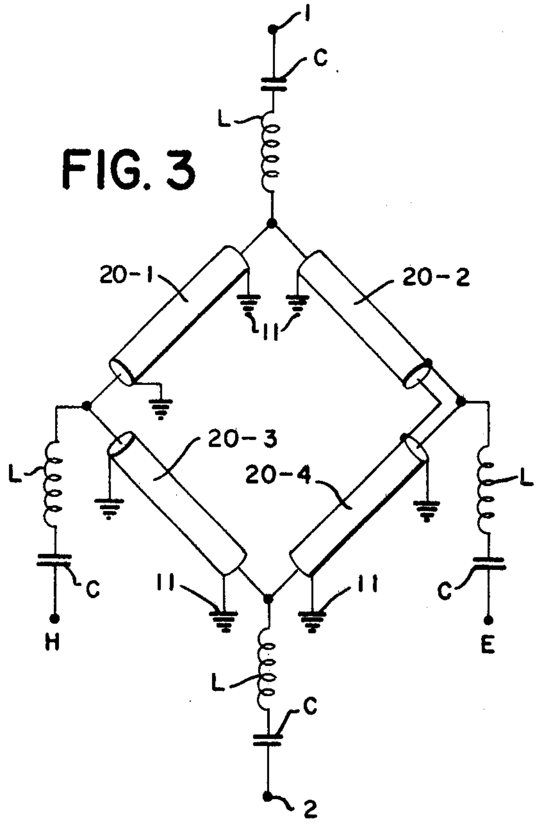
FIG. 3 is a schematic diagram of a hybrid ring network according to the present invention.

FIG. 3 shows the hybrid ring of the present invention which has four transmission line sections 20–1, 20–2, 20–3 and 20–4 connected in the same manner as sections 10 of the hybrid of FIG. 1, including the 180° transposition between arms 20–2 and 20–4. Here, a compensating network is connected between each of the four junctions and the respective network terminals 1, 2, E and H. As shown, each compensating network comprises a series connected inductor L and capacitor C which is capable of providing a series resonant effect at a particular frequency. This is discussed in greater detail below. Inductor L has a reactance $X_L$ and capacitor C a reactance $X_C$. In series, the total reactance $\alpha=X_L-X_C$ in the conventional manner.

Figure 4:
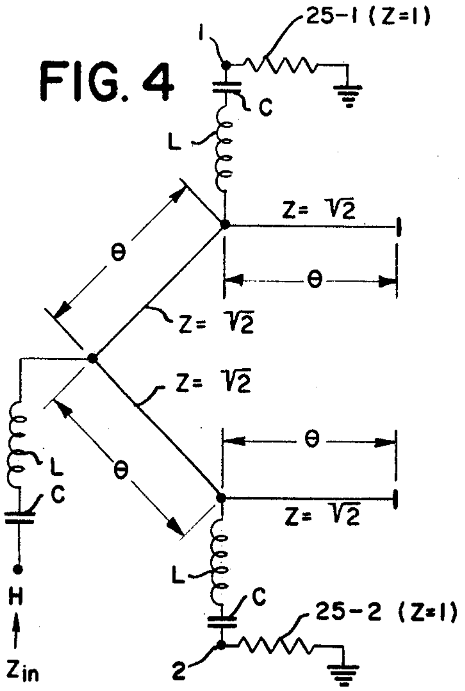
FIG. 4 is a schematic diagram of the equivalent circuit of the network of FIG. 3.

FIG. 4 is the equivalent circuit of the hybrid network of FIG. 3 formed in the same manner as the equivalent circuit of FIG. 2. As before, the electrical length of each section 20 is given in electrical degrees by $\theta$; the characteristic impedance of the system $Z_0=1+j0$; the characteristic impedance Z of each section 20 is $\sqrt{2Z_0}=\sqrt{2}$ and terminals 1 and 2 are terminated by impedances 25–1 and 25–2 of the same values ($Z=1$) as the characteristic impedance of the system.

Letting $$\alpha=X_L-X_C \quad (2)$$

then the input impedance ($Z_{in}$) for the circuit of FIG. 4 can be shown to be:

$$Z_{in}=\frac{1+2\alpha\sqrt{2}\,\text{Cot}\,\theta-\alpha^2(1-\text{Cot}^2\,\theta)+j[\alpha(1-\text{Cot}^2\,\theta)-\sqrt{2}\,\text{Cot}\,\theta}{1-\text{Cot}^2\,\theta+j[\alpha(1-\text{Cot}^2\,\theta)-\sqrt{2}\,\text{Cot}\,\theta]} \quad (3)$$

Setting $Z_{in}=1+j0$ and solving for $\alpha$ from (3), then $$\alpha=\frac{\text{Cot}\,\theta}{1-\text{Cot}^2\,\theta}[\sqrt{2}\pm\sqrt{3-\text{Cot}^2\,\theta}] \quad (4)$$

For an octave bandwidth, that is from:

$$\theta_1=60° \text{ to } \theta_2=120°$$

the limits for $\alpha$ at the ends of the octave in a typical hybrid made in accordance with invention can be calculated as $$\alpha_1=-.18947 \quad (5)$$

and $$\alpha_2=.18947 \quad (6)$$

Substituting Equations 5 and 6 in Equation 2 gives:

$$X_{L1}=.18947 \quad (7)$$

and $$X_{C1}=.37894 \quad (8)$$

for $\alpha_1$, that is, at $\theta=60°$.

Substituting Equations 7 and 8 in Equation 2 gives:

$$\alpha=.18947\left[\frac{\theta}{60°}-\frac{120°}{\theta}\right]$$

Substituting values of $\theta$ in Equations 3 and 9, the values of input impedance ($Z_{in}$) and input VSWR ($\rho$) can be calculated. These are shown in Table II for $\theta$ going from 30° to 135°.

TABLE II

| $\theta°$ | $Z_{in}$ | $\rho$ |
|---|---|---|
| 30 | .7534+j .1385 | 1.390 |
| 40 | .9979+j .0076 | 1.008 |
| 45 | 1.00−j .0192 | 1.018 |
| 50 | .9954−j .0197 | 1.021 |
| 60 | 1.000+j .0000 | 1.000 |
| 70 | 1.0127+j .0088 | 1.015 |
| 80 | 1.0137+j .0040 | 1.014 |
| 90 | .9990+j .0000 | 1.001 |
| 100 | .9810+j .0066 | 1.021 |
| 110 | .9779+j .0162 | 1.028 |
| 120 | 1.000+j .0000 | 1.000 |
| 130 | 1.0228+j .0969 | 1.103 |
| 135 | 1.000−j .1913 | 1.210 |

The values of $\rho$ from Table II are plotted as curve 40 on FIG. 5.

As can readily be seen from comparison of curves 30 and 40 of FIG. 5, the hybrid ring T of the subject invention has a better input impedance match over a wider range of frequency than does the T of the prior art. To state it another way, the input VSWR of the subject invention can be made lower over a wider band of input operating frequencies than can the T of the prior art, it being remembered that $\theta$ is directly related to the frequency of the input signal. This structure also maintains the high isolation between the conjugate E and H terminals. In addition, due to the reduction in input VSWR the isolation between terminals 1 and 2 of the hybrid is also increased.

The values of $\alpha$ selected for Equations 5 and 6 above are not critical. Different values can be selected to achieve either a wider operating bandwidth at the expense of increased input VSWR or a narrower operating bandwidth with lower input VSWR.

To further consider the types of compensating networks which can be used, it should be noted, from Equation 4 that in order to make $Z_{in}$ equal to $1+j0$ over the operating band of the network, for example one octave, that $\alpha$ goes from negative (capacitive) to positive (inductive) reactance. This is indicated in Equations 5 and 6 by the plus and minus signs. Therefore, the compensating circuits must have the property of being able to produce this reactance change over the operating bandwidth. One simple compensating circuit having this property is the series resonant circuits shown in FIGS. 3 and 4. Of course, other more complicated compensating circuits having this property also can be used, these being of the passive or active type. Also, for example, the simple compensating circuits used in FIGS. 3 and 4 can have additional compensating circuits connected thereto to smooth out the VSWR curve or to tailor the response of the hybrid network to a particular frequency and/or span of bandwidth of the input signal. The latter is accomplished using the same techniques employed in the design of iterative filters and general filter design. Alternatively, the simple series resonant circuits of FIGS. 3 and 4 can be replaced by a more complicated filter type network which can produce the needed reactance change over the operating bandwidth.

While the hybrid ring of the subject invention is shown as being formed by coaxial cables, it can also be made from: stripline (both balanced and unbalanced); balanced two-wire transmission line; waveguide; and combinations of these transmission media. The provision of the 180° phase transposition and the analysis of each hybrid ring formed by the different materials is carried out in the conventional manner.

Further, while the compensating circuits are shown as lumped L and C elements, other elements can be used. These include the distributed L and C parameters provided by a transmission line or coaxial cable of the correct impedance value and combinations of lumped and distributed parameters.

While a preferred embodiment of the invention has been described, above, it will be understood that this is illustrative only, and the invention is limited solely by the appended claims.

What is claimed is:

1. A wide band hybrid ring network comprising first, second, third and fourth electromagnetic wave transmission means, said transmission means each having an impedance of $\sqrt{2}$ times a common characteristic input transmission impedance and being connected end-to-end to form a closed loop with one of said transmission means having a transposition to invert the polarity of signals passing therethrough, a first pair of input terminals at the junction of said first and fourth transmission means, adapted to be connected to a source of electrical signals to energize said loop with a signal in a predetermined frequency band, a second pair of input terminals at the junction of said second and third transmission means, each of said transmission means being approximately a quarter wavelength long at the mean frequency of said band, a first pair of output terminals at the junction of said first and second transmission means, a second pair of output terminals at the junction of said third and fourth transmission means and compensating circuit means comprising a series resonant circuit means having a resonance point substantially at the center frequency of said frequency band connected in series with one of said terminals of at least two of said pairs of terminals, each of said series resonant circuit means having a reactance change from positive to negative reactance over said frequency band, the portion of each of said series resonant circuit means providing the inductance having an inductive reactance at a frequency substantially at the center of the frequency band of substantially one-half or less of said common characteristic input transmission impedance.

2. A compensated hybrid ring as set forth in claim 1 wherein each series resonant circuit is resonant at the same frequency.

3. A compensated hybrid ring as set forth in claim 1 wherein the series resonant circuit comprises an inductor and a capacitor connected in series.

4. A compensated hybrid ring network as set forth in claim 1 wherein each of said sections of said electromagnetic wave transmission means comprises a transmission line having first and second conductors, the first conductors of three adjacent pairs of said transmission lines connected together to form three of said junctions and the first and second conductors of the remaining adjacent pair of said transmission lines connected to from the 180° phase transposition and the fourth junction, the second conductor of the first mentioned three adjacent pairs of transmission line means and the second and first conductors of the said remaining adjacent pair of transmission line means.

5. A compensated hybrid ring as set forth in claim 4 wherein at least one of said transmission means has a portion thereof electrically connected to a plane of reference potential.

6. A hybrid ring network as in claim 1 further comprising a said series resonant circuit means connected in series with one of said terminals of each of said four pairs of terminals.

7. A compensated hybrid ring as set forth in claim 6 wherein each series resonant circuit is resonant at the same frequency.

8. A compensated hybrid ring as set forth in claim 6 wherein the series resonant circuit comprises an inductor and a capacitor connected in series.

9. A compensated hybrid ring network as set forth in claim 6 wherein each of said sections of said electromagnetic wave transmission means comprises a transmission line having first and second conductors, the first conductors of three adjacent pairs of said transmission lines connected together to form three of said junctions and the first and second conductors of the remaining adjacent pair of said transmission lines connected to from the 180° phase transposition and the fourth junction, the second conductor of the first mentioned three adjacent pairs of transmission line means and the second and first conductors of the said remaining adjacent pair of transmission line means.

10. A compensated hybrid ring as set forth in claim 9 wherein at least one of said transmission means has a portion thereof electrically connected to a plane of reference potential.

References Cited

UNITED STATES PATENTS

| | | | |
|---|---|---|---|
| 2,111,743 | 3/1938 | Blumlein et al. | 343—860 |
| 2,440,081 | 4/1948 | Fick | 343—860 X |
| 2,735,986 | 2/1956 | Hylas et al. | 333—11 |
| 2,920,323 | 1/1960 | Dunson | 333—32 X |

OTHER REFERENCES

E. W. Schwittek, Impedance Matching, Electronic Design, Mar. 18, 1959, p. 18 relied on.

HERMAN KARL SAALBACH, Primary Examiner

P. L. GENSLER, Assistant Examiner

U.S. Cl. X.R.

333—32